Dec. 10, 1963    B. F. GREGORY    3,113,471
POWER TRANSMISSION ASSEMBLY
Filed Feb. 5, 1962
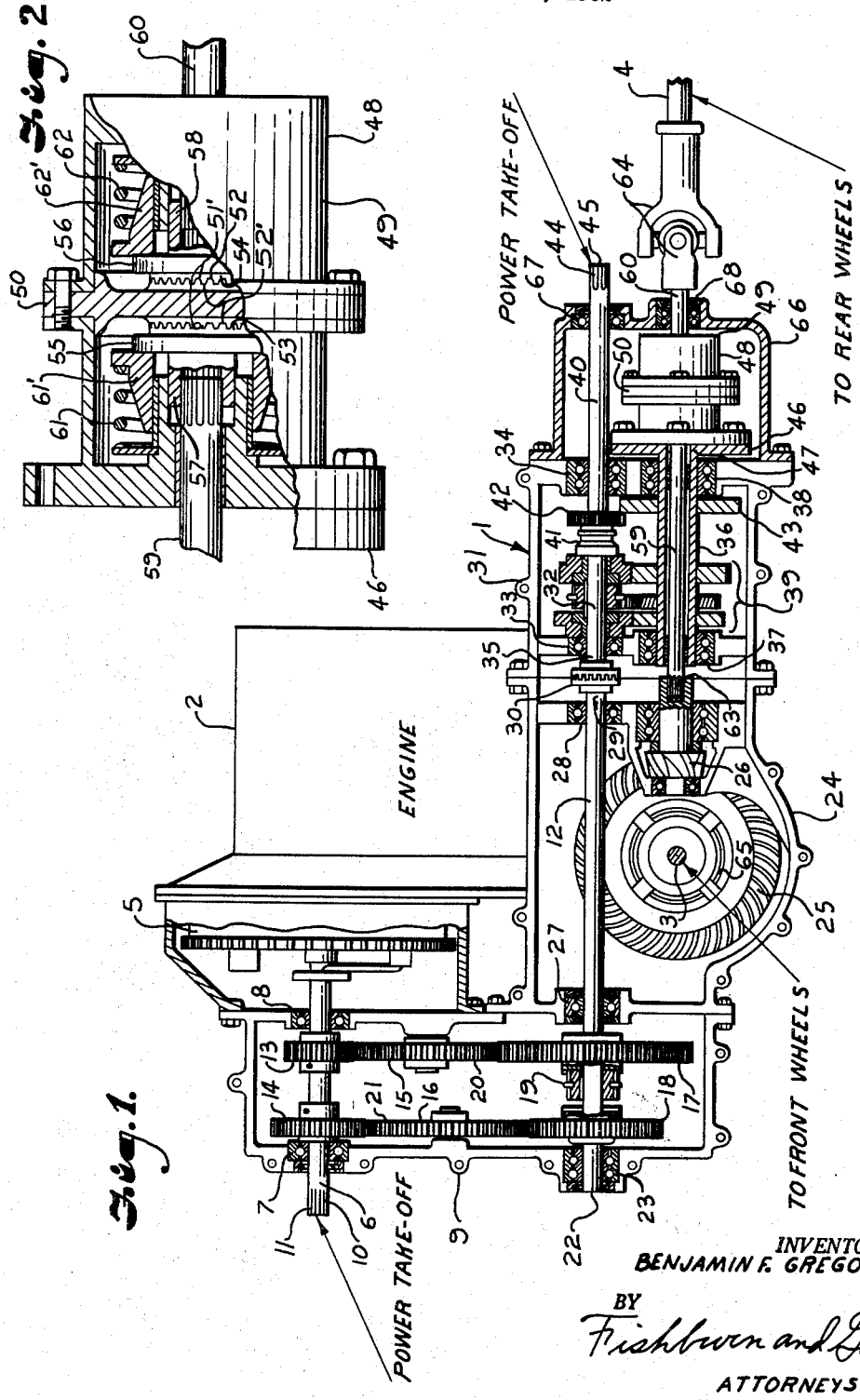
INVENTOR.
BENJAMIN F. GREGORY
BY
Fishburn and Gold
ATTORNEYS

United States Patent Office 3,113,471
Patented Dec. 10, 1963

3,113,471
POWER TRANSMISSION ASSEMBLY
Benjamin F. Gregory, Kansas City, Mo., assignor to Fred N. Maloof, Washington, D.C.
Filed Feb. 5, 1962, Ser. No. 171,015
3 Claims. (Cl. 74—701)

This invention relates to improvements in power transmissions and more particularly to a power transmission arrangement adapted especially for short wheel base vehicles of the general class commonly referred to as "jeep."

The design, installation, and maintenance of power transmission systems in short wheel base, general purpose vehicles has presented serious problems because of the need for a complex and rugged assembly in an extremely limited space. Such vehicles usually require several forward speeds and a reverse speed, both forward and reverse speeds operable over at least two ranges, plus the ability when desired of driving the vehicle simultaneously by both front and rear wheels.

Significant improvements in transmission arrangements for such vehicles have heretofore been developed (for example, see Patent No. 2,821,868), however, such arrangements present difficult maintenance problems due to the use of power transmission chains and the complex combination of a clutch unit with a speed shifting gear assembly.

The principal objects of the present invention are: to provide a four-wheel drive power transmission assembly for motor vehicle wherein the clutch unit which is operatively located between the front and rear wheel drive shafts is supported in a conveniently accessible position removed from the speed shifting gear assembly; to provide such an arrangement wherein relatively rotatable shafts, one contained within the other, simultaneously drive the clutch unit input and the front wheel axle; to provide such a transmission arrangement wherein driving chains are eliminated and replaced with reliable and easily accessible gear trains having idler gears operatively separating the driving and driven shafts thereof; and to provide such an improved transmission arrangement which is extremely simple in construction, is easily accessible for maintenance and yet offers all the desired functions expected in vehicles of this type.

Other objects and advantages of this invention will become apparent from the following description taken in connection with the accompanying drawings wherein are set forth by way of illustration and example certain embodiments of this invention.

FIGURE 1 is a fragmentary sectional view in side elevation showing a power transmission arrangement embodying this invention operably coupled to a prime mover and a front wheel axle and a rear wheel drive shaft.

FIGURE 2 is a fragmentary view in side elevation on an enlarged scale with a portion broken away showing details of the clutch drive unit assembled with the power transmission.

Referring to the drawings in more detail:

The reference numeral 1 generally indicates a power transmission arrangement particularly adapted for short wheel base general purpose motor vehicles of the general class commonly referred to as "jeep." The assembly arrangement 1 is illustrated operably connected to a prime mover or internal combustion engine 2 shown schematically and located in a position generally intermediate the ends and above the transmission arrangement 1. The transmission arrangement 1 is operably connected as hereinafter described to a front wheel axle 3 and a rear wheel drive shaft 4 whereby four-wheel drive is provided for the vehicle. The engine 2 overlies the front wheel axle and is coupled through a conventional clutch assembly 5 to a prime drive shaft 6 extending forwardly of the engine. The clutch assembly 5 selectively operatively connects the prime drive shaft 6 to the engine 2 in response to the manipulation of well known clutch controls (not shown) by the vehicle operator.

The prime drive shaft 6 is rotatably mounted in bearings 7 and 8 supported on opposite walls of a prime gear case 9 which is adapted to be easily opened and/or disassembled from the balance of the transmission arrangement. A portion 10 of the prime drive shaft 6 extends forwardly and exteriorly of the prime gear case 9 and terminates in coupling splines 11 adapting the portion 10 for use as a power take-off to drive auxiliary equipment (not shown).

A driven shaft 12 is located between the engine 2 and the front wheel axle 3 and extends parallel to the prime drive shaft 6 and into the prime gear case 9. A first prime gear 13 and a second prime gear 14 of different pitch diameters are respectively fixed in space relation on the prime drive shaft 6 and are located within the prime gear case 9. A first prime idler gear 15 and a second prime idler gear 16 of different pitch diameters are respectively rotatably mounted on and within the prime gear case 9 and are respectively operatively meshed with the prime gears 13 and 14. First and second driven gears 17 and 18 of different pitch diameters are mounted on the driven shaft 12 and are rotatable with respect thereto. The driven gears 17 and 18 are located within the prime gear case 9 and are respectively operatably meshed with the idler gears 15 and 16. A clutch assembly 19 is located between the driven gears 17 and 18 and is operatably associated therewith in a conventional manner for rotatively fixing selectively the driven gears 17 and 18 with the driven shaft 12 for driving the shaft 12. The prime gears 13 and 14, idler gears 15 and 16 and driven gears 17 and 18 form first and second gear trains respectively designated 20 and 21 and adapted to transmit power between the prime drive shaft 6 and the driven shaft 12 at two different speed ranges depending upon which driven gear 17 or 18 is coupled for rotation with the shaft 12. The forward end 22 of the shaft 12 is rotatably mounted in a bearing 23 supported on the prime gear case 9.

An intermediate gear case 24 is removably secured to the prime gear case 9 and contains a portion of the front wheel axle 3 and a ring gear 25 operably connected to the front wheel axle 3 for driving same as described hereinafter. A pinion 26 is journaled within the intermediate gear case 24 operatively meshed with the ring gear 25. The intermediate gear case 24 also provides a mounting for bearings 27 and 28 which rotatively support the intermediate and rear portions of the driven shaft 12.

The driven shaft 12 extends through the intermediate gear case 24 and terminates at the rear end 29 thereof in an axially releasable shaft coupling 30. A rear gear case 31 is removably secured to and rearwardly of the intermediate gear case 24 and rotatably supports a shaft section 32 in spaced bearings 33 and 34. The forward end 35 of the shaft section 32 terminates in the shaft coupling 30 for operative engagement with the driven shaft 12. It is noted that the shaft 12 and shaft section 32 are easily disengaged from each other upon axial separation thereof.

An elongated tube or hollow shaft 36 has a major portion thereof contained in said rear gear case 31 and is spaced from and extends parallel to the shaft section 32. The hollow shaft 36 is adapted to rotate on spaced bearings 37 and 38 supported by the rear gear case 31. The hollow shaft 36 and shaft section 32 operatively support a set of conventional shiftable intermeshing transmission gears 39 within the rear gear case 31 for selectively transmitting power over several speeds from the shaft section 32 to the hollow shaft 36 in a well known manner. A rearwardly extending portion of the shaft section 32 forms a power take-off shaft 40. The shaft 40 is normally rendered rotatable with respect to the balance of the shaft section 32 by means of a journaling support housing 41. The support housing 41 is operatively connected to a gear 42 adapted to be selectively meshed with a gear 43 fixed to the hollow shaft 36 for driving the power take-off shaft 40 when desired. Suitable splines 44 are provided on the rear end 45 of the shaft 40 to permit coupling with equipment (not shown) adapted to be driven thereby.

A face plate 46 is fixed to the hollow shaft 36 at the rear end 47 thereof which is positioned rearwardly externally of the rear gear case 31. A limited slip clutch unit 48 is secured to the face plate 46 for continuous rotation therewith, said face plate providing power input to the clutch unit in a manner becoming apparent hereinafter.

The clutch unit 48 comprises an outer case 49 rigidly secured to a disk-like central slip limiting section 50 extending thereinto and having operatively disposed faces 51 and 52 of sloping teeth 51' extending laterally therefrom. The teeth 51' on the faces 51 and 52 are respectively engaged with integral mating teeth 52' on faces 53 and 54 of collars 55 and 56. The collars 55 and 56 are mounted on a common axis within the case 49 and are freely rotatable with respect to the case 49 in absence of the teeth engagement. The collars 55 and 56 each terminate in oppositely facing spline sockets respectively designated 57 and 58 for respectively receiving a forward output shaft 59 and a rear output shaft 60 extending forwardly and rearwardly of the clutch unit 48. Helical compression springs 61 and 62 respectively urge longitudinally movable sleeves 61' and 62' against the collars 55 and 56 for moving the teeth 52' into engagement with the teeth 51' on slip-limiting section 50. Relative slip between the collars 55 and 56 and the section 50 can occur only upon the overcoming of the respective springs whereupon the teeth will slip in discrete steps permitting respective relative and independent rotation between the clutch unit case 49 and the output shafts 59 and 60.

The forward output in the illustrated example, shaft 59 extends coaxially within and through the hollow shaft 36 and terminates in coupled relation at 63 to the pinion 26 for driving the ring gear 25 and hence the front wheel axle 3. The rear output shaft 60 terminates in a universal joint 64 operatively connected to the rear wheel drive shaft 4 for ultimately driving the rear wheels (not shown). It is to be understood that this invention is particularly adapted for use in 4-wheeled vehicles having a front wheel axle and differential assembly and a rear wheel axle and differential assembly, only a portion 65 of the front wheel axle and differential assembly being shown.

A case or shell 66 is removably secured to the rear gear case 31 and covers the face plate 46, clutch unit 48 and a portion of the power take-off shaft 40. The shell 66 also provides a mounting for bearings 67 and 68 for rotatably supporting the rear end portion of the power take-off shaft 40 and the rear output shaft 60.

The above described transmission arrangement permits great ease of accessibility to the clutch unit 48 without the necessity of disturbing the transmission gear set 39 and without substantially increasing the total volume required to house the transmission assembly. The gear trains 20 and 21 offer high reliability and configuration of the prime gear case 9 provides ease of access to the gear trains 20 and 21 and connected shafts when necessary. It is to be understood that while one form of this invention has been illustrated and described, it is not to be limited to this specific form and arrangement of parts herein described and shown except insofar as such limitations are included in the claims.

What I claim and desire to secure by Letters Patent is:

1. In a motor vehicle having a front wheel axle and a rear wheel drive shaft:
   (a) a prime mover, a prime drive shaft extending from said prime mover, clutch means for selectively operatively connecting said prime drive shaft to said prime mover,
   (b) a driven shaft, means adapted to selectively transmit power between said prime drive shaft and said driven shaft at different speed ranges,
   (c) a front axle drive gear operatively connected to said front wheel axle, a pinion operatively meshed with said front axle drive gear,
   (d) a hollow elongated shaft spaced from said driven shaft and having a rear end, a rear gear case located rearwardly of said front axle and containing a major portion of said hollow shaft, said hollow shaft rear end extending externally of said rear gear case, a set of shiftable intermeshing transmission gears contained in said rear gear case and operatively mounted between said driven shaft and hollow shaft for transmitting power in selected speeds from said driven shaft to said hollow shaft,
   (e) a clutch unit operatively connected to said hollow shaft rear end externally of said rear gear case, said hollow shaft being adapted to provide the power input to said clutch unit, and
   (f) forward and rear output shafts extending respectively forwardly and rearwardly of said clutch unit,
   (g) said forward output shaft extending coaxially within and through said hollow shaft and rear gear case and terminating in operatively coupled relation to said pinion,
   (h) said rear output shaft terminating in operatively coupled relation to said rear wheel drive shaft.

2. The apparatus of claim 1 including:
   (a) a prime gear case containing said means adapted to selectively transmit power between said prime drive shaft and said driven shaft, an intermediate gear case removably secured to said prime gear case and containing said front axle drive gear and pinion,
   (b) said driven shaft extending through said intermediate gear case,
   (c) said rear gear case being removably secured to said intermediate gear case,
   (d) a face plate fixed to said hollow shaft rear end,
   (e) said clutch unit being secured to said face plate, and
   (f) a shell removably secured to said rear gear case and covering said face plate and said clutch unit.

3. In a motor vehicle having a front wheel axle and a rear wheel drive shaft:
   (a) a prime mover overlying the front wheel axle,
   (b) a horizontal prime drive shaft extending forwardly from the prime mover and having means for operatively connecting the same thereto,
   (c) a driven shaft between the prime mover and said front axle and beneath the prime drive shaft in parallelism therewith,
   (d) structure for operatively interconnecting said prime drive shaft and driven shaft,
   (e) an elongated hollow shaft spaced beneath the driven shaft and in parallelism therewith, (f) said hollow shaft being located behind the front axle and perpendicularly thereto,
(g) a transmission operatively connecting said driven shaft and hollow shaft,
(h) a clutch unit located rearwardly remotely of said transmission and connected to said hollow shaft, said hollow shaft providing the input to said clutch unit,
(i) and forwardly and rearwardly extending output shafts operatively connected to said clutch unit,
(j) said forwardly extending output shaft extending through said hollow shaft past said transmission and being operatively connected to said front wheel axle,
(k) said rearwardly extending output shaft being operatively connected to said rear wheel drive shaft.

References Cited in the file of this patent
UNITED STATES PATENTS

| | | |
|---|---|---|
| 2,431,982 | Barnett | Dec. 2, 1947 |
| 2,811,859 | Peras | Nov. 5, 1957 |
| 2,821,868 | Gregory | Feb. 4, 1958 |
| 3,017,787 | Payne | Jan. 23, 1962 |